United States Patent [19]

Klompien

[11] Patent Number: 4,971,504
[45] Date of Patent: Nov. 20, 1990

[54] BALE PICKUP TRANSFER AND STACKING APPARATUS

[75] Inventor: Kenneth Klompien, Bozeman, Mont.

[73] Assignee: Dew Eze Manufacturing, Inc., Harper, Kans.

[21] Appl. No.: 415,070

[22] Filed: Sep. 29, 1989

[51] Int. Cl.$^5$ .......................... A01D 87/12; B60P 1/50
[52] U.S. Cl. .................................. 414/111; 280/415.1; 414/24.5; 414/493; 414/789.7; 414/551; 414/556
[58] Field of Search ............... 414/111, 24.5, 789.7, 414/469, 474, 476, 492, 493, 546, 551, 554, 556; 280/465.1

[56] References Cited

U.S. PATENT DOCUMENTS

| | | | |
|---|---|---|---|
| 3,138,274 | 6/1964 | Delbridge | 414/492 X |
| 3,341,039 | 9/1967 | Cranage | |
| 3,647,091 | 3/1972 | Walters | |
| 3,942,666 | 3/1976 | Pfremmer | 414/24.5 X |
| 4,019,643 | 4/1977 | Kampman et al. | |
| 4,068,804 | 1/1978 | Butler et al. | 414/492 X |
| 4,204,790 | 5/1980 | Baxter | 414/24.5 |
| 4,248,561 | 2/1981 | Graves | 414/24.5 |
| 4,253,786 | 3/1981 | Harkness | 414/24.5 |
| 4,268,199 | 5/1981 | Fontrier | 414/551 X |
| 4,358,235 | 11/1982 | Butler et al. | 414/111 X |
| 4,441,845 | 4/1984 | Gibson | 414/111 X |
| 4,508,359 | 4/1985 | Campbell et al. | 414/24.5 X |
| 4,573,845 | 3/1986 | Carpenter | |
| 4,619,570 | 10/1986 | Siebenga | |
| 4,630,986 | 12/1986 | Taylor | 414/789.7 X |
| 4,634,336 | 1/1987 | Pearle | 414/24.5 X |
| 4,741,656 | 5/1988 | Bishop | 414/111 X |
| 4,789,289 | 12/1988 | Wilson | 414/493 X |

FOREIGN PATENT DOCUMENTS

| | | | |
|---|---|---|---|
| 554828 | 3/1958 | Canada | 414/789.7 |
| 1011297 | 5/1977 | Canada | 414/24.5 |
| 2560488 | 9/1985 | France | 414/24.5 |
| WO84/02474 | 8/1982 | Int'l Pat. Institute | 414/24.5 |
| WO86/07234 | 12/1986 | Int'l Pat. Institute | 414/24.5 |

Primary Examiner—Robert J. Spar
Assistant Examiner—Robert S. Katz
Attorney, Agent, or Firm—Litman, McMahon & Brown

[57] ABSTRACT

A bale handling apparatus, particularly for loading, stacking and retrieving large rectangular bales, includes an elongated bed mounted on a vehicle adapted for forward loading of bales into a loading cradle pivotally connected to the front of the bed. The loading cradle includes two sections pivotally connected to each other such that the angle between the two sections changes during the loading cycle to support the bale and then push the bale onto the elongated bed. Curved loading forks projecting from one of the loading cradle sections are adapted to slide under a bale to be loaded and also aid in stabilizing the bales accumulated on the bed as the bed is pivoted from the horizontal loading position to a vertical position to create a bale stack that may be retrieved by the apparatus at a later time.

10 Claims, 3 Drawing Sheets

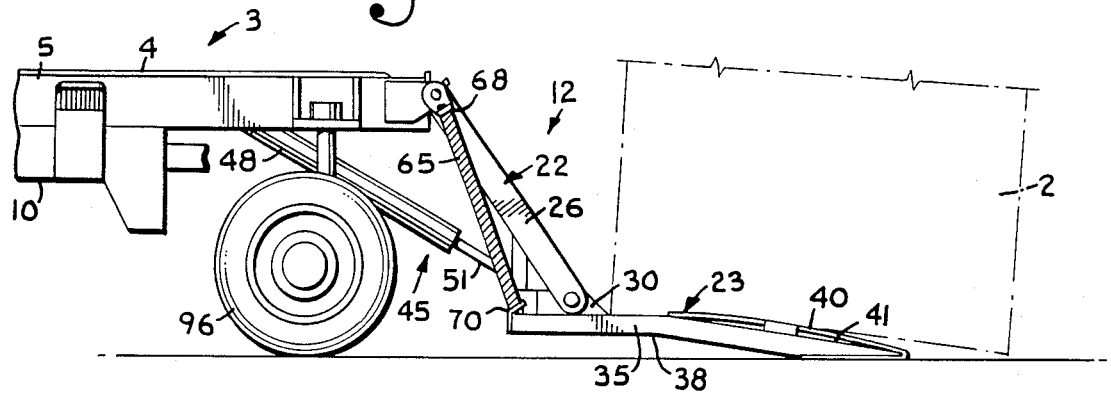
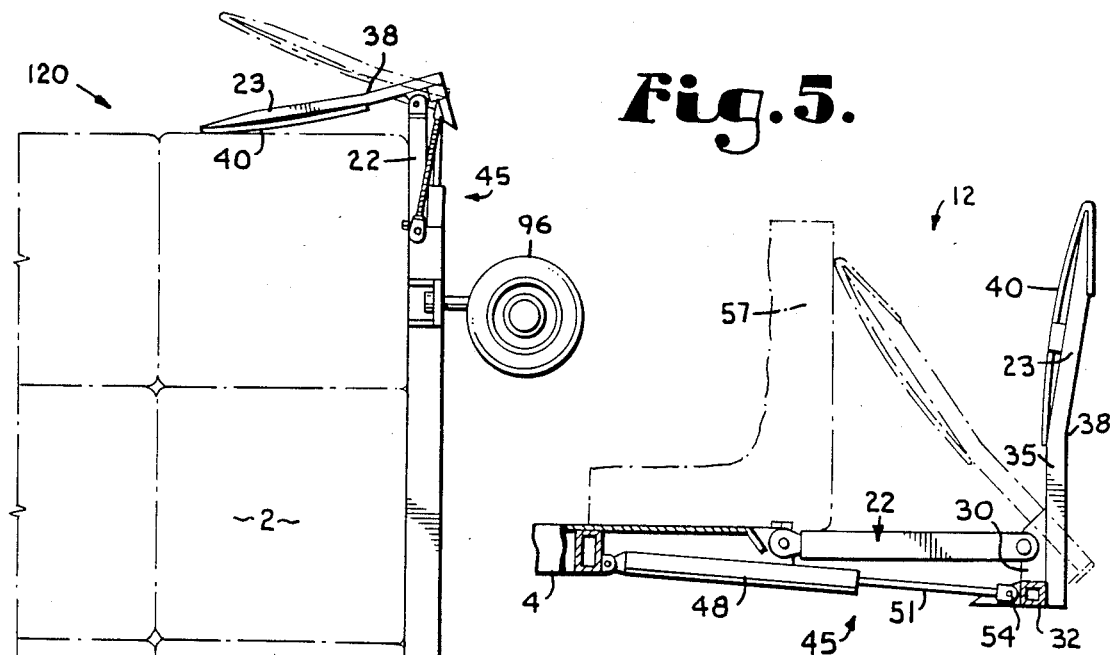
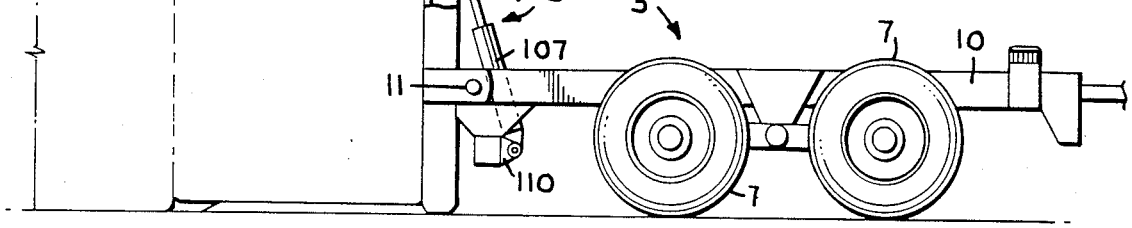

BALE PICKUP TRANSFER AND STACKING APPARATUS

FIELD OF THE INVENTION

The present invention relates to devices for the handling of large hay bales that are too heavy to be manually carried, and more particularly to an improved front loading and stacking vehicle for handling large rectangular bales.

BACKGROUND OF THE INVENTION

Hay bale pickup and transfer vehicles for large, heavy bales have been utilized for many years. Prior art bale handling devices often include loading ramps having forks that slide under a bale and pivot to a vertical position, depositing the bale on the bed of a truck or trailer. During the pivoting of the loading ramp, the bale is primarily supported by the loading ramp until the bale reaches the truck bed.

The ramps of the prior art are either of one piece construction or contain two sections that remain at a generally constant angle with respect to each other. Although the angle between the two sections may sometimes be manually adjusted, each bale is slightly different and individual manual adjustment is not practical. The one or two section ramps may therefore not properly cradle the bale and the bale is apt to shift sideways during loading which at best may cause uneven placement of the bales on the bed and at worst may result in the bale toppling off the side of the loading ramp, particularly if the bale is large.

Also, in the prior art, the loading of an entire truck or trailer bed is often accomplished by either a conveyor belt, or just by pushing each load gradually down the length of the bed by each new load that is deposited. Either of these methods often requires expensive, heavy duty transfer equipment. At least parts of such transfer equipment often must be permanently mounted on a truck, requiring purchase of both a specialized truck and bale handling equipment, adding to the expense of the hay baling operation. Mounting the bale handling equipment on a truck also requires the operator to back up to lift a bale which is inconvenient and time consuming.

SUMMARY OF THE INVENTION

The bale handler of this invention includes a wheeled vehicle having an elongated bed for bale transfer, stacking and retrieval of previously stacked bales. A bale loading cradle is pivotally mounted to the front of the bed. In the preferred embodiment, the vehicle is towed by a tractor or suitable truck and forward loading of the bales is possible by a towing device that provides for towing of the vehicle either offset from the tractor or directly behind same.

The bale loading cradle includes two sections pivotally connected to each other. The first section pivoting from a position inclined toward the ground during bale pickup to a nearly horizontal position when a bale is loaded onto the bed. The second section of the cradle contains curved spears or loading forks for slipping under bales and is in a nearly horizontal position during bale pickup. The second section pivots to a near vertical position as the edge of the bale is deposited onto the bed. The second section then pivots further to push the bale completely onto the bed. During the loading process, the angle between the first section and second section changes from an angle greater than ninety degrees to an acute angle substantially less than ninety degrees providing adequate support for the bale as it is urged onto the bed and to further push the bale a short distance so that the bale is substantially resting on the bed before the loading cradle pivots downward to pick up the next bale. The loading of each bale onto the bed followed by the pushing motion of the loading cradle advances the previously loaded bales down the length of the bed.

The vehicle of this invention is also equipped with means for pivoting the entire bed from a horizontal position to a vertical position to unload all of the bales on the bed to create a bale stack that may be retrieved by the vehicle at a later time.

Preferably, the mechanisms for pivoting the vehicle into an offset position, loading bales and unloading and loading bale stacks, are hydraulic cylinders.

OBJECTS OF THE INVENTION

An object of this invention is to provide a front loading bale pickup apparatus for loading generally rectangular bales with improved control and support of the bale during loading.

Another object is to provide such a front loading bale pickup apparatus that is simple and inexpensive.

Yet another object of this invention is to provide such a front loading bale pickup apparatus that unloads the bales into a stack and is able to retrieve the entire stack as it was loaded for transport to another location.

Yet another object of this invention is to provide such a front loading bale pickup apparatus that is an elongated trailer with a loader mounted thereon having improved control and support of the bale during loading.

Yet another object of this invention is to provide a bale pickup apparatus that topples bales onto an elongated bed, the toppling motion aiding the advancement of previously loaded bales down the length of the bed.

A further object of this invention is to provide such a bale pickup apparatus that is relatively easy to use, inexpensive to construct and particularly well adapted for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 4 is an enlarged and fragmentary side elevational view of the apparatus showing the loading cradle, the bed and the frame wherein the loading cradle is in a lowered bale pickup position and a hay bale being picked up thereby is shown in phantom lines.

FIG. 5 is an enlarged, fragmentary cross-sectional view of the loading cradle for the apparatus, taken along 5—5 of FIG. 3., showing the rear portion of the loading cradle in an intermediate bale loading position or bale transport position in solid lines and in a completed bale discharge position in phantom lines.

FIG. 6 is an enlarged, fragmentary side elevational view of the apparatus with the bed rotated relative to the frame to a vertical bale stacking or retrieving position having hay bales shown in phantom lines along the bed and stacked upon the ground.

BRIEF DESCRIPTION OF THE INVENTION

Figure 1:
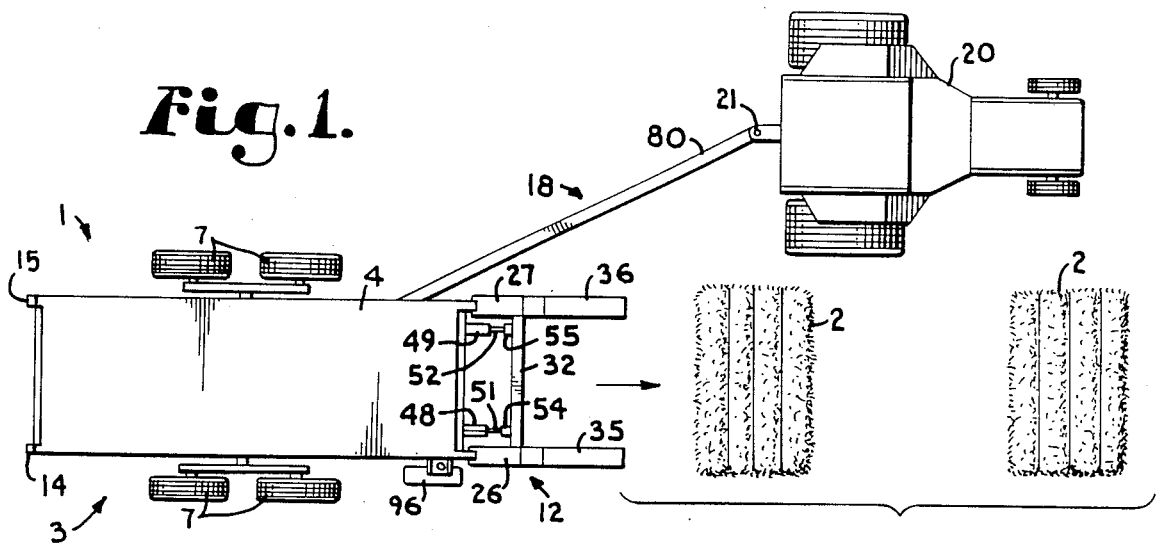
FIG. 1 is a top plan view of a bale pickup transfer and stacking apparatus in accordance with the present invention including a frame, a bed, a loading cradle and an offset tow bar shown being drawn by a tractor and with hay bales to be loaded thereby.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

FIGS. 1 through 9 generally illustrate a bale pickup, transfer and stacking apparatus in accordance with the present invention, generally designated by the reference numeral 1 for lifting, accumulating and stacking large square bales 2. The apparatus 1 includes a wheeled vehicle 3 having a substantially elongated bed 4, supported by an upper frame 5.

The illustrated wheeled vehicle 3 is an elongated trailer. Wheels 7 are mounted on a lower frame 10 at the center of the wheeled vehicle 3. The upper frame 5 is pivotally attached to the lower frame 10 at a pivot axle 11. A loading cradle mechanism 12, is pivotally mounted on the upper frame 5 at the forward end of the vehicle 3. Parallel and spaced elongate stops 14 and 15, perpendicular to the bed 4 are mounted on the upper frame 5 at the rear end of the vehicle 3. A tow mechanism 18, pivotally connected to the lower frame 10 extends from the forward end of the vehicle 3 for coupling to a towing or tractor means such as the illustrated tractor 20 having a hitch 21.

The loading cradle mechanism 12 shown in FIGS. 1 through 6 is a forked frame structure divided generally into two sections or portions 22 and 23 respectively. The first section 22 has a pair of parallel connecting members 26 and 27 respectively, extending forwardly from the vehicle 3, each pivotally connected at one end to the upper frame 5 and pivotally connected at the opposite end thereof to mounts 30 integral with the second section 23.

The second section 23 includes a transverse bar 32 to which the mounts 30 are attached. Two loading forks 35 and 36 respectively are fixedly mounted to the transverse bar 32 and extend forwardly therefrom. Each fork 35 and 36 is generally flat and tapers towards the forward end. A second transverse bar or plate (not shown) may be attached to the loading forks 35 and 36 near the ends thereof and extend therebetween to provide additional support during hay bale loading. The loading forks 35 and 36 each bend slightly at a location represented by the reference numeral 38 near the center of each fork 35 and 36 so that the forward portion of each fork 35 and 36 inclines slightly toward the ground when the rear portion of such fork is in a horizontal position. Additionally, curved plates 40 are fixedly attached to a top surface 41 of the forward portion of each fork 35 and 36 creating an arc relative to the top surface allowing for improved contact with hay bales 2. The curved plates 40 aid in holding the bales 2 in place during transport and unloading of a stack of bales 2.

Two hydraulic cylinder and piston devices are generally represented by the reference numeral 45 and are mounted in parallel between the upper frame 5 and the transverse bar 32 to raise, lower and rotate the loading cradle 12. The cylinders 48 and 49 respectively are located generally below the upper frame 5, and are fixedly attached thereto. The cylinders 48 and 49, are preferably connected with the hydraulic auxiliary power take off system of the tractor 20 by hoses or the like (not shown) so as to be remotely operable by the tractor operator. The pistons 51 and 52 are pivotally attached to supports 54 and 55 respectively that are integral with the transverse bar 32. The cylinder and piston devices 45 are located near the ends of the transverse bar 32 and equadistant therefrom, but between members 26 and 27 of the first section 22 of the loading cradle 12.

Figure 2:
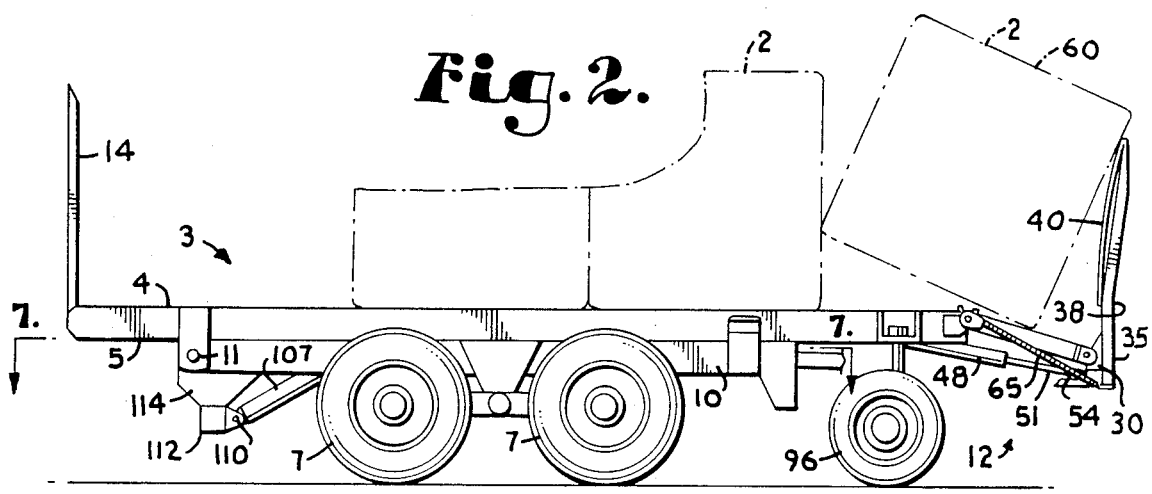
FIG. 2 is an enlarged side elevational view of the apparatus with the loading cradle in a partially raised loading position and having hay bales shown in phantom lines on the loading cradle and the bed.
Figure 3:
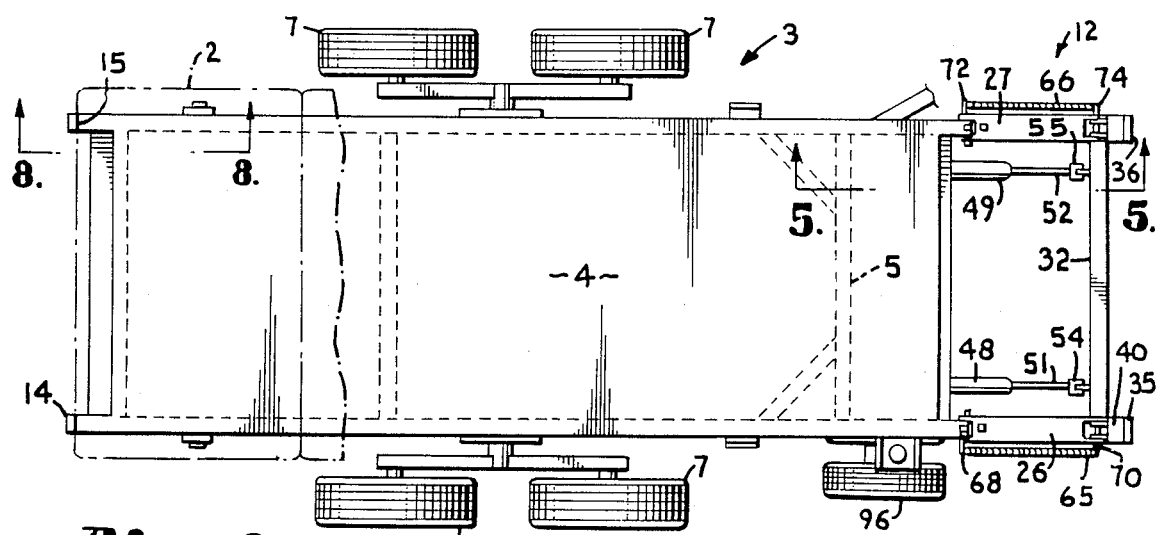
FIG. 3 is an enlarged top plan view of the apparatus with the loading cradle in a fully raised position and having hidden detail of an upper portion of the frame shown in dashed lines and a hay bale shown in phantom lines.

Extension of the pistons 51 and 52 from the cylinders 48 and 49 respectively rotates the loading cradle 12 from the ground contact position shown in FIG. 4, through the intermediate position shown in FIG. 2 to the raised position shown in solid lines in FIG. 5 to the final bale placing position shown in phantom lines in FIG. 5 wherein the second section 23 pushes a bale 57 from a position halfway between the bed 4 and the first section 22, to a position totally on the bed 4. The action of the pistons 51 and 52 pivot the first section 22 from a bale receiving position that is inclined toward the ground to a bale discharge position that is generally horizontal and pivots the second section 23 from a horizontal bale pickup or receiving position to a bale discharge position at an angle of less than ninety degrees relative to the bed 4. The angle between the loading cradle first section 22 and the second section 23 changes from greater than ninety degrees at the ground contact position to less than ninety degrees when a bale 2 is positioned onto the bed 4, thereby providing continuous support to two sides of a bale 2 during the loading cycle.

As shown in FIG. 2, when successive bales 2 are loaded onto the bed 4, the toppling or twisting action of the bale 60 being loaded, rotated by the loading cradle 12 advances the movement of all the bales 2 down the length of the bed 4. The pushing action of the second section 23, against the bale 60 being loaded must therefore only advance all the bales 2 a relatively short distance until the bale 60 is completely on the bed 4, completing the bale loading cycle.

Guard rails 62 that are secured on either side of the bed 4 substantially along the length thereof prevent narrow bales from slipping off the sides of the bed 4. The first bale loaded progresses down the bed 4 until it reaches stops 14 and 15 which prevent it from being pushed off the rear end of the vehicle 3. Upon completion of the bale loading process, retraction of the cylinder devices 45, lowers the loading cradle 12 back into the ground contact, bale receiving position.

Biasing means such as the illustrated pair of springs 65 and 66 connect the first section 22 to the second section 23 so as to bias the loading forks 35 and 36 away from members 26 and 27 respectively. Spring 65 is attached to member 26 at a support 68 located near where member 26 pivots on the upper frame 5 and is attached to forks 35 at a support 70 located near the rear end of fork 35 behind where member 26 pivots with the second section 23. Spring 66 is attached to member 27 at a support 72 located near where member 27 pivots on the upper frame 5 and is attached to fork 36 at a support 74 located near the rear end of fork 36 behind where member 27 pivots with the second section 23.

The springs 65 and 66 improve the bale loading operation at two points during the bale loading cycle. After a bale loading cycle is completed and the operator begins to retract the pistons 51 and 52 to rotate the loading cradle 12 into a bale receiving position, the springs 65 and 66 place additional pull on the loading forks 35 and 36 thereby forcing such forks into a downward position sooner than if the rotation thereof were accomplished by the cylinder and piston 51 and 52 action alone. The springs 65 and 66 help to keep the forks 35 and 36 in the proper downward position as the vehicle 3 moves toward a bale 2 to be picked up. Once the bale 2 is picked up and the pistons 51 and 52 begin to extend, the springs 65 and 66 keep the loading forks 35 and 36 at an approximately constant angle relative to the members 26 and 27 for a short period of time until the action of the pistons 51 and 52 overcomes the biasing of the springs 65 and 66. The spring biasing results in improved support for the bale 2 for a longer period of time than if the apparatus relied merely on the action of the hydraulic cylinders and pistons 45 to cradle the bale 2 during the loading process.

Figure 7:
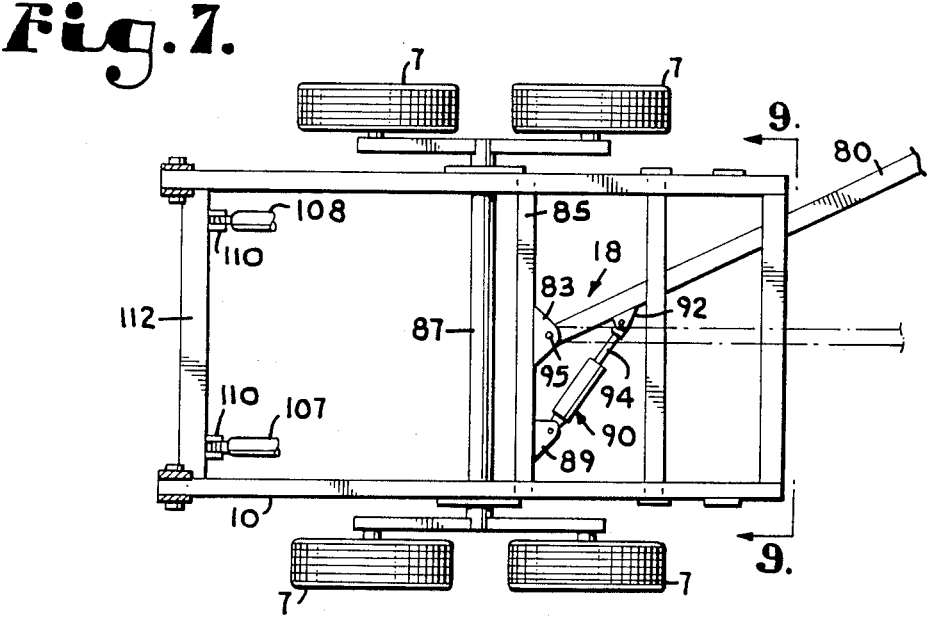
FIG. 7 is an enlarged, fragmentary cross-sectional view of the apparatus, taken along 7—7 of FIG. 2 showing the frame and the offset tow mechanism in a bale pickup position in solid lines and in a bale transport position in phantom lines.
Figure 9:
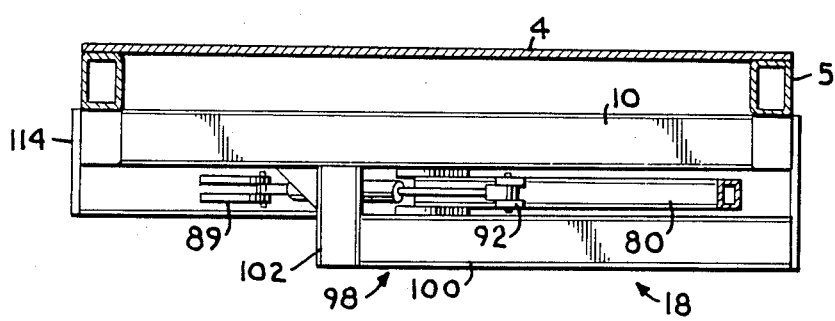
FIG. 9 is an enlarged cross-sectional view of the apparatus, taken along 9—9 of FIG. 7.

The front loading capability of the apparatus is accomplished by use of the a tow mechanism 18, shown in FIGS. 1, 7 and 9. The tow mechanism 18 includes a tongue 80 directed forwardly from the vehicle 3 connectable at one end to the tractor 20 and pivotally attached to a web support 83 at the other end. The web support 83, is centrally located on and fixedly attached to a transverse support shaft 85 located on the lower frame 10 of the apparatus 1. The support shaft 85 is located in front of a wheel axle 87.

A second web support 89 is fixedly attached to the transverse shaft 85 at a location between the first web support 83 and the edge of the lower frame 10. Ram means such as illustrated hydraulic cylinder and piston unit 90 are connected between the second web support 89 and a third web support 92 located on the tongue 80, so that when a piston 94 thereof is operably extended, the vehicle 3 pivots about a pivot pin 95 on a caster wheel 96 attached to the upper frame 5 and located on the side of the vehicle 3, as is shown in FIG. 1, until the tongue 80 is in the position shown by solid lines in FIG. 7. An L-shaped bracket 98, having a horizontal section 100 attached to the side of the lower frame 10 and located below the tongue 80 and a vertical section 102 centrally attached to the lower frame 10, captures the tongue 80 and limits offset towing to one side of the tractor 20.

In operation, the apparatus 1 may be hauled onto the hay field with the tongue 80 positioned as is shown by phantom lines in FIG. 7. Before picking up a first bale 2, an operator extends the piston 94 preferably from the tractor 20 through use of a hydraulic auxiliary power take off system of the tractor 20 connected to the hydraulic cylinder and piston unit 90. As the piston 94 extends, the vehicle 3 pivots about the pivot point 95 and the caster wheel 96 until the tongue 80 is at the preferred offset location and the piston 94 is haulted. Bales 2 may then be loaded onto the loading cradle 12 as the operator drives the tractor 20 in a forward direction. Once the bed 4 is filled with bales 2, the hydraulic cylinder and piston unit 90 is operated to retract the piston 94 and return to a position directly behind the tractor 20 for transport along roads or the like.

Figure 8:
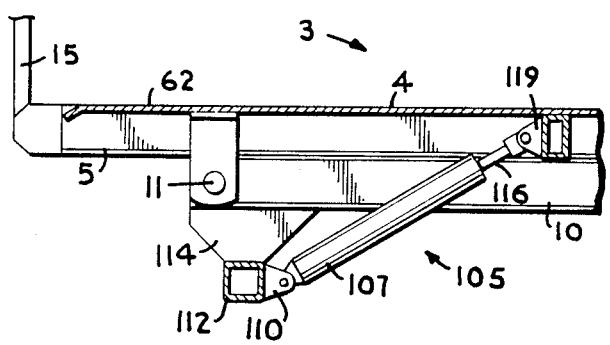
FIG. 8 is a fragmentary, enlarged cross-sectional view of a portion of the bed and frame of the apparatus, taken along 8—8 of FIG. 3.

For stack 120 placement on the ground or pickup therefrom the action of ram means such as the illustrated pair of hydraulic cylinder and piston units 105, that are mounted on the lower frame 10 near the rear thereof and connected to the upper frame 5, pivot the upper frame 5 and bed 4 about the pivot axle 11 for bale removal and bale stack retrieval. The cylinders 107 and 108 respectively are pivotally connected to supports 110 affixed to a transverse support beam 112 located below the lower frame 5 and connected to the same by wedge shaped supports 114 integral with the sides of the lower frame 10, located at the rear thereof. The pivot points for the cylinders 107 and 108 are located slightly forward from the pivot axle 11. The upper frame 5 and the bed 4 extend rearwardly beyond the lower frame a short distance, when the bed 4 is in a horizontal position. The pistons 116 and 117 respectively are pivotally connected to support wedges 119, fixedly attached to the upper frame 5, as is shown in FIG. 8.

In operation, the pistons 116 and 117 are extended to pivot the upper frame 5 and bed 4 from a horizontal loading and transferring position to a nearly vertical bale unloading or bale stack retrieval position. Preferably the hydraulic cylinder and piston units 105 are connected to a hydraulic auxiliary power takeoff system of the tractor 20 and are remotely operated by the vehicle operator. If the operator is unloading a bed 4 filled with the bale stack 120, the pistons 116 and 117 are extended, causing the bed 4 to pivot to a vertical position. During the unloading cycle, the loading cradle 12 and the rear stops 14 and 15, hold the bale stack 120 in place. Once the bed 4 is in a verticle position, as shown by FIG. 6, the operator slowly drives forward, sliding the stops 14 and 15 out from under the bale stack 120 to unload the stack 120.

The operation works in reverse for picking up bale stacks 120. The operator backs the truck upto the stack 120 and the stops 14 and 16 slip under the entire bale stack 120. The curved shaped second section 23 of the loading cradle 12 slides over and grips onto the top surface of the top bale of the stack 120. The operator then retracts the pistons and the bed 4 pivots to the horizontal filled with hay bales 2.

It is to be understood that while certain forms of the present invention have been illustrated and described herein, it is not to be limited to the specific forms or arrangement of parts described and shown.

What is claimed and desired to be secured by Letters Patent is as follows:

1. An apparatus for picking up and transporting bales of hay comprising:
   a. a vehicle having an elongated bed adapted to hold a plurality of bales thereon;
   b. a loading cradle hingedly attached to said bed at one end thereof; said loading cradle being pivotal between a bale receiving position and a bale discharge position; said loading cradle having a first portion pivotally attached to a second portion and pivotally attached to said bed; said first portion inclined downwardly toward the ground when said loading cradle is in the bale receiving position thereof and generally horizontal when said loading cradle is in the bale discharge position thereof; said second portion adapted for maneuvering under hay bales opposite said first portion when in a generally horizontal position at ground level in said bale receiving position; said second portion being at an angle greater than ninety degrees relative to said first portion when said loading cradle is in the bale receiving position; said second portion being rotatable to a position leaning toward said bed at an angle less than ninety degrees relative to said first portion when said loading cradle is in the bale discharge position so as to be adapted to urge a bale off said first portion and onto said bed; and
   c. means attached to said second portion for pivoting said loading cradle from the bale receiving position to the bale discharge position.

2. The apparatus of claim 1, wherein:
   a. said second portion bends slightly near the center thereof so as to approximately form an arc with the concave side of said arc facing downwardly when the loading cradle is in the bale receiving position.

3. The apparatus of claim 2 wherein said second portion includes:
   a. first and second parallel forks hingedly attached to said first portion.

4. The apparatus of claim 1, including:
   a. a spring biasing means attached to said first and second portions and adapted to bias a distal end of said second portion toward the ground when said loading apparatus is lowered to the bale receiving position and to bias said end away from said first portion during the pivoting of said loading cradle.

5. An apparatus for picking up, carrying and unloading large, generally rectangular bales of hay or the like, adapted to be drawn by a tractor; said apparatus comprising:
   a. a wheeled vehicle having an elongated bed adapted to hold a plurality of bales in adjacent side-by-side relationship substantially along the length of said bed; said bed having a first end and a second end;
   b. stop means extending outwardly from said bed near the first end thereof;
   c. a loading cradle connected to said bed second end being pivotal between a bale receiving position to a bale discharge position; said loading cradle having a first portion pivotally attached to a second portion thereof and pivotally attached to said bed; said first portion being inclined downwardly when said loading cradle is in the bale receiving position and being generally horizontal when said loading cradle is in the bale discharge position; said second portion adapted for maneuvering under hay bales in said bale receiving position and being at an angle greater than ninety degrees relative to said first portion when said loading cradle is in a bale receiving position and said second portion being rotatable to a position generally leaning towards said bed and being at an angle less than ninety degrees relative to said first portion when said loading cradle is in the bale discharge position so as to be adapted to urge a bale a short distance along said first portion and onto said bed;
   d. means attached to said second portion for pivoting said loading cradle from the bale receiving position to the bale discharge position; and
   e. means for pivoting said bed between a horizontal position for loading of the bales onto said bed and a nearly upright position for stacking said bales vertically on the ground; said bales being supported by said stop means during the pivoting of said bed; and said stop means adapted to slip out from under the stack of bales as the apparatus is pulled away from the bale stack.

6. The apparatus of claim 5, including:
   a. biasing means attached to and extending between said first and second portions; said biasing means adapted to bias said second portion toward the ground when said loading apparatus is lowered to the bale receiving position and to bias said first portion away from said second portion during the pivoting of said loading cradle.

7. The apparatus of claim 5, wherein said second portion includes:
   a. first and second parallel forks; each of said forks having a top and being hingedly attached to said first portion near one end thereof; said forks having a bend so as to extend generally to the ground when said loading cradle is in the bale receiving position; and
   b. contouring means fixedly attached to each of said forks and forming a curved surface above each of said fork tops.

8. The apparatus of claim 5 wherein:
   a. said vehicle includes a tongue having a forward end adapted to be connected to a towing tractor; said tongue pivotally connected to said vehicle so as to allow a towing tractor operator to swing said vehicle to one side of the towing tractor to allow for front loading of bales onto said bed.

9. The apparatus of claim 8 wherein:
   a. said tongue and said cradle are both positioned near the front end of said vehicle such that said apparatus is adapted to engage and pick up bales while moving forward.

10. An apparatus for picking up, carrying, unloading, stacking and retrieving stacks of large, generally rectangular bales of hay or the like, and adapted to be drawn by tractor means, comprising:
    a. a wheeled vehicle having a lower frame pivotally connected to an upper frame;
    b. a tongue pivotally connected to said lower frame and having a forward end adapted to be connected to the tractor means;
    c. ram means connected to said lower frame and to said tongue for pivoting the vehicle relative to said tongue between an offset position to allow for front loading of bales and a trailing position for transport of the bales;
    d. an elongated bed adapted to hold a plurality of bales in side-by-side relationship substantially along the length of said bed and being mounted on said upper frame; said bed having a first end and a second end;

e. a stop generally perpendicularly extending from said bed near said first end;

f. a loading cradle connected to said second end being pivotal between a bale receiving position and a bale discharge position; said loading cradle having first and second parallel intermediate legs pivotally connected respectively to first and second parallel forks and pivotally attached to said bed; said intermediate legs being generally rectangular in shape and being inclined downwardly toward the ground when said loading cradle is in the bale receiving position and being generally horizontal when said loading cradle is in the bale discharge position; said forks adapted for maneuvering under hay bales and being at an angle greater than ninety degrees relative to said intermediate legs when said loading cradle is in a bale receiving position and being rotatable to a position generally leaning towards said bed at an angle less than ninety degrees relative to said intermediate legs when said loading cradle is in the bale discharge position so as to be adapted to urge a bale on said loading cradle along said intermediate legs and onto said bed;

g. ram means attached to said forks for pivoting said loading cradle from the bale receiving position to the bale discharge position;

h. first spring biasing means extending between said first intermediate leg and said first fork and adapted to bias said first fork toward the ground when said loading apparatus is lowered to the bale receiving position and to bias said first intermediate leg away from said first fork during the pivoting of said loading cradle;

i. second spring biasing means extending between said second intermediate leg and said second fork and adapted to bias said second fork toward the ground when said loading apparatus is lowered to the bale receiving position and to bias said second intermediate leg away from said second fork during the pivoting of said loading cradle; and j. ram means for pivoting said bed and upper frame between a horizontal position for bale loading and transport and a nearly upright position for bale unloading and stacking.

* * * * *